United States Patent
Garfunkel et al.

(10) Patent No.: US 8,824,106 B1
(45) Date of Patent: Sep. 2, 2014

(54) TWO SENSOR READER FOR HARD DISK DRIVE (HDD)

(71) Applicant: Headway Technologies, Inc., Milpitas, CA (US)

(72) Inventors: Glen Garfunkel, San Jose, CA (US); David Hu, Los Altos, CA (US); Moris Dovek, San Jose, CA (US); Yan Wu, Cupertino, CA (US); Joseph Smyth, Aptos, CA (US); Min Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/897,379

(22) Filed: May 18, 2013

(51) Int. Cl.
*G11B 5/33* (2006.01)

(52) U.S. Cl.
USPC .......................................................... 360/316

(58) Field of Classification Search
USPC .......................................................... 360/316
See application file for complete search history.

(56) References Cited

U.S. PATENT DOCUMENTS

| | | | |
|---|---|---|---|
| 6,801,410 B2 | 10/2004 | Xue et al. | |
| 7,239,570 B2 | 7/2007 | Kumar et al. | |
| 7,684,148 B2 * | 3/2010 | Biskeborn | 360/121 |
| 7,911,743 B2 * | 3/2011 | Hachisuka et al. | 360/316 |
| 7,924,533 B2 * | 4/2011 | Maejima et al. | 360/316 |
| 8,026,715 B2 | 9/2011 | Pozidis et al. | |
| 2007/0242378 A1 | 10/2007 | Ikegami et al. | |
| 2012/0206830 A1 | 8/2012 | Gao et al. | |

FOREIGN PATENT DOCUMENTS

DE    3535671    4/1987

OTHER PUBLICATIONS

"Two-Dimensional Magnetic Recording at 10 Tbits/in$^2$," by R. H. Victora, IEEE Transactions on Magnetics, vol. 48, No. 5, May 2012, pp. 1697-1703.

"Future Options for HDD Storage," by Y. Shiroishi et al., IEEE Transactions on Magnetics, vol. 45, No. 10, Oct. 2009, pp. 3816-3822.

"Analysis of Shingle-Write Readback Using Magnetic-Force Microscopy," by Fabian Lim et al., IEEE Transactions on Magnetics, vol. 46, No. 6, Jun. 2010, pp. 1548-1551.

"Shingled Magnetic Recording and Two-Dimensional Magnetic Recording," by Roger Wood, IEEE Magnetics Society, Santa Clara Valley Chapter, Hitachi Global Storage Technologies, Oct. 19, 2010, pp. 1-59.

* cited by examiner

*Primary Examiner* — Mark Blouin
(74) *Attorney, Agent, or Firm* — Stephen B. Ackerman; Saile Ackerman LLC

(57) ABSTRACT

A read head with two read sensors enables reading of a magnetically recorded medium of increased areal densities such as would be provided by two-dimensional magnetic recording. The two sensors, which may be formed in separate depositions, are arranged vertically relative to each other as top and bottom sensors, with a downtrack displacement between them that is less than 900 A and a crosstrack displacement that is less than 600 A. Their separate free layers are connected by four or three conducting leads and require no junctions for their connections. In one embodiment each sensor has separate top and bottom shields and leads. In another embodiment, there is a common shield and lead between the two sensors, but a separate top shield/lead for the top sensor and bottom shield/lead for the bottom sensor.

27 Claims, 3 Drawing Sheets

TWO SENSOR READER FOR HARD DISK DRIVE (HDD)

BACKGROUND

1. Technical Field

This disclosure relates generally to thin-film magnetoresistive read sensors and particularly to the use of configurations of two such sensors in a single read head to implement "two dimensional magnetic recording".

2. Description

So called "two dimensional magnetic recording" promises increased areal density in HDD (hard disk drive) applications. This promise will be achieved by a means that include analysis of multiple readback signals from the same recorded track, instead of the conventional single readback signal used in current magnetic recording. Two dimensional magnetic recording is described in R. H. Victora et al., "Two-Dimensional Magnetic Recording at 10 Tbits/in$^2$". IEEE Transactions On Magnetics, Vol. 48, No. 5, May 2012. In addition, the design of read head arrays is also taught in Ikegami et al. (US Publ. Pat. Appl. 2007/0242378), Gao et al. (US Publ. Pat. Appl. 2012/0206830), Reinhart (EPO Pat. Appl. DE 3535671) and Kumar et al. (U.S. Pat. No. 7,239,570).

Advanced signal processing of the multiple read signals of a single HDD datatrack, and/or a portion of its neighboring track, allows for improved signal-to-noise and improved decoding of the written pattern. For HDD applications, the multiple readback signals can be acquired either by multiple reads of a single sensor, such as would be obtained by multiple passes produced by multiple disk rotations, or by the use of multi-sensor heads, or by a combination of both.

Space and tolerance constraints, among other issues, prohibit the construction of multiple sensor heads for real applications using conventional techniques. While the two dimensional recording concepts were first published over five years ago (see Y. Shiroishi, Intermag 2009, FA-01 and also, F. Lim et al., Intermag 2010), there have been no proposals for a practical multisensory head for realistic applications in a HDD to improve performance, with or without corresponding use of the two dimensional recording concepts. As a result, implementations have been restricted to those that require a multi-pass reading of recorded data, which brings with it serious cost and performance penalties. We note that the references indicated above, including descriptions of two dimensional recording in the various journals and conference proceedings and the several prior art references, do not contradict our assertions as to the present lack of viability of realistic multi-sensor arrays.

SUMMARY

The first object of this disclosure is to fabricate a two head read sensor for HDD applications.

A second object of this disclosure is to provide such a two head read sensor that, in conjunction with advanced signal processing, will enable higher areal recording densities on the recording media and an increase in performance to be achieved.

A third object of this disclosure is to provide such a two head read sensor for use within a two dimensional magnetic recording scheme.

A fourth object of this disclosure is to provide a mechanism to implement single pass reading of two-dimensionally recorded magnetic media rather than multi-pass reading.

A fifth object of this disclosure is to provide such a two head read sensor where the two free layers (one in each sensor) are coupled in the conducting leads region, without necessitating the formation of a junction between the sensors.

These objects will be achieved by the design and fabrication of a two-sensor read head structure, whose separate free layers are coupled in a leads region and wherein the two sensors are separated in the downtrack direction by less than 900 A (Angstroms) and are separated in the crosstrack direction by less than 600 A. Suitable signal processing of the two signals, provided by each of the two sensors, allows a >10% increased area density of the recording media and improved performance, when compared to the conventional single sensor head.

Referring first to schematic FIG. 1, there is shown a planar view of the ABS (air bearing surface) of the two sensors. For simplicity, the sensor structure is reduced to two parallel lines, the bottom sensor (20) being a thick solid line, the top sensor being a broken line. It is understood that a magnetic free layer is contained within these lines.

The crosstrack direction (double-ended arrow (50)) will hereinafter be denoted as the X-direction, the downtrack direction (single ended arrow (60)) will be denoted the Y-direction and the Z-direction (shown in FIG. 2) will denote the front (ABS) to back direction. The top and bottom sensors are separated by a downtrack separation (30), called here the Y-Separation and which may be measured as the separation between their two horizontal free layers (not shown); the two sensors are also separated by a crosstrack separation (40), called here the X-Separation, or ΔX, which may be measured by a separation between their vertical axes of symmetry, (22) and (11).

Referring now to schematic FIG. 2, there is shown the construction of FIG. 1 in a plan view, looking down from above at the X-Z plane. The upper sensor (10) is shown in dashed lines, the lower sensor (20) is shaded and shown in solid lines. The ABS surface (70) is shown. Also shown is ΔX (40).

DETAILED DESCRIPTION

The present disclosure describes two embodiments of a two-sensor read head structure that is particularly designed to implement the improved areal density magnetic recording provided by two-dimensional magnetic recording. The two-sensor read head structure, includes independent free layers that are coupled in a leads region. The sensors themselves are substantially identical in form and layer structure. They are separated in a downtrack direction (Y-direction) by an amount ΔY that is less than 900 A (Angstroms). This downtrack separation may be measured as the vertical separation between their parallel free layers. The sensors are also separated in crosstrack direction (X-direction) by an amount ΔX that is less than 600 A. This X-direction separation may be measured as a separation between the vertical axes of symmetry of the sensor elements.

Suitable signal processing of the two signals that are independently provided by the two sensors, allows a >10% increased area density of the recording media and improved performance, when compared to the conventional single sensor head.

Figure 1:
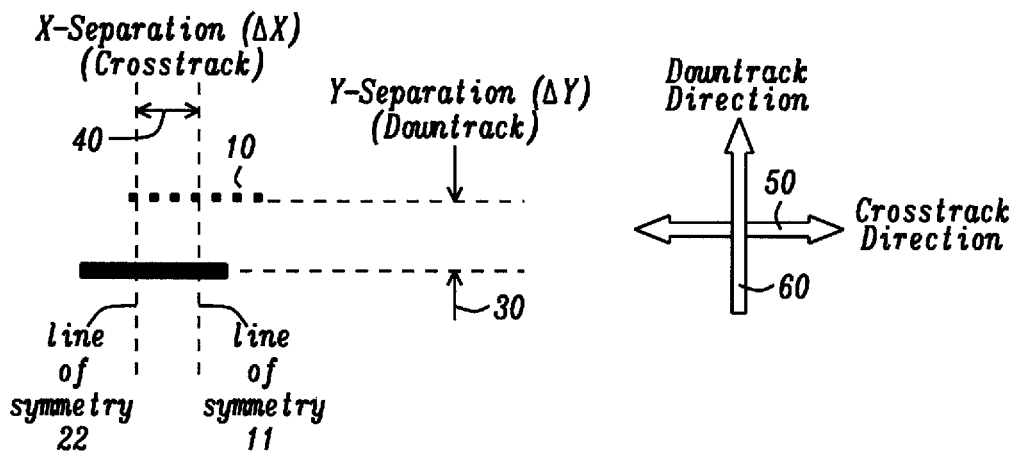
FIG. 1 is a schematic representation of an ABS view of the two read sensors disclosed herein.
Figure 2:
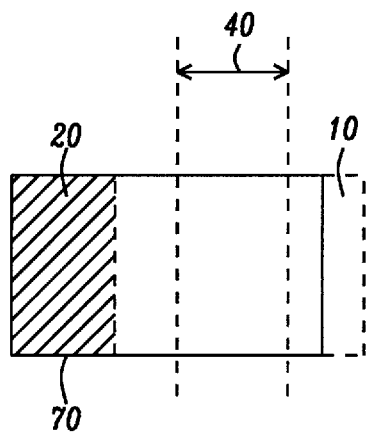
FIG. 2 is a schematic representation in a plan view (overhead) showing the same two sensors of FIG. 1.
Figure 3:
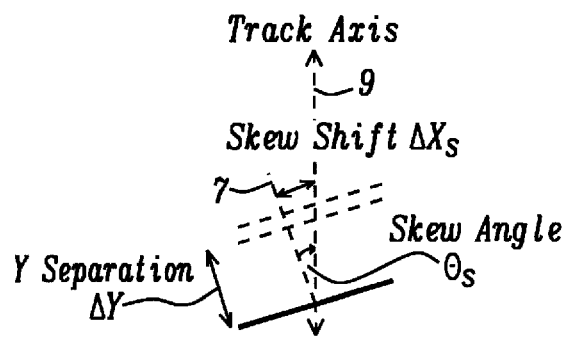
FIG. 3 is a schematic representation of the two sensors of FIGS. 1 and 2, showing how a skew angle (angle between the track centerline and a perpendicular to the deposition plane of the sensor free layer) of the sensors affects the alignment of the sensors relative to the track.

As shown in FIG. 3, the two-sensor head must operate over a range of skew angles, $\theta_S$, (angle between the track axis (9) and a perpendicular (7) to the deposition plane of the sensor free layer) extending preferably between +/−16° or more. These skew angles create a corresponding shift in crosstrack separation relative to the recorded track, denoted the skew-shift, $\Delta X_s$, between the two sensors in the amount: $\Delta X_s = \Delta Y \tan \theta_s$. For a recording medium track density of 500 kTPI (kilo tracks per inch), the track pitch (distance between adjacent track centerlines) is 50 nm. If the maximum acceptable skew angle is to be $\theta_s = 16°$, then, in order to insure that the skew-induced $\Delta X_s$ is kept beneath one-half the track pitch (25 nm), the maximum sensor separation in the Y-direction is (approximately):

$$\Delta Y_{max} = \Delta X_s / \tan \theta_s = (25 \text{ nm}) / \tan 16° \approx 900 \text{ A}.$$

To achieve such a narrow separation between the two sensors, the shields between the sensors, as will be shown below, are formed to a thickness less than 250 A, which is significantly less than the shield thickness range between 700 A and 2 micron range common in the industry today.

In addition to the constraint on ΔY due to the variation in skew angle, there is also a constraint on ΔX, the crosstrack separation produced by the fabrication process, so that the two sensors are guaranteed to be reading the same track even if the skew angle were zero. This constraint can be achieved by making ΔX less than the track pitch, which is taken to be ΔX 600 A in these embodiments.

First Embodiment

Figure 4:
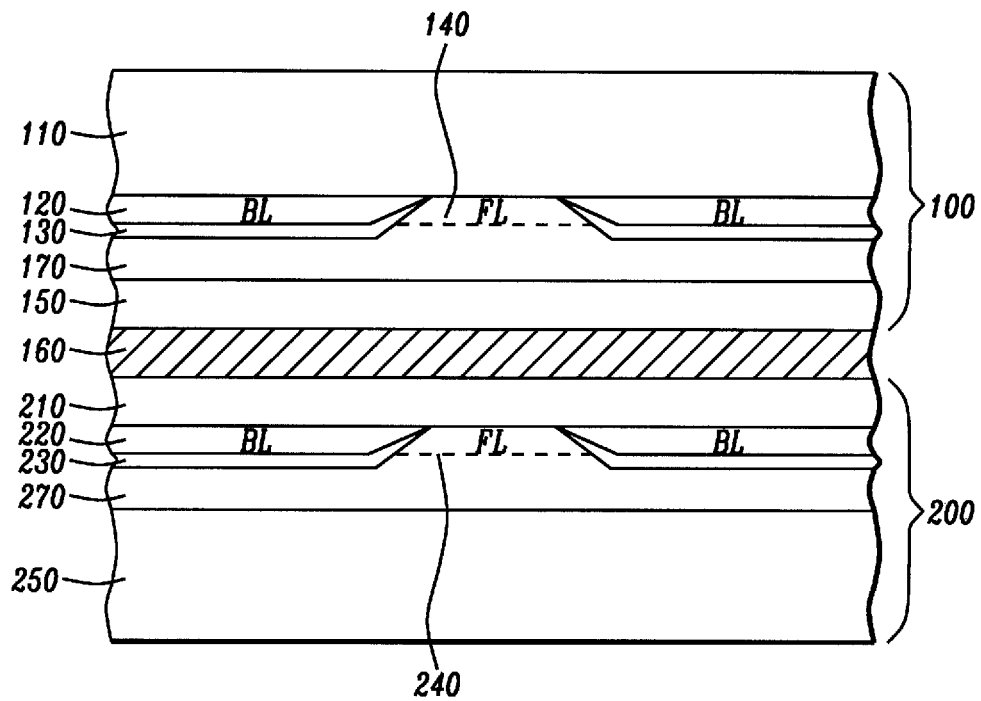
FIG. 4 is a more detailed schematic ABS view (X-Y plane cross-section) of a first embodiment of the two sensors of FIGS. 1 and 2, showing the sensor layer structure as well as the various layers that separate the sensors in a Y-direction. The sensors are shown as being aligned in the X-direction, but this is not a necessary configuration and is shown for simplicity.

Referring next to FIG. 4, there is shown a detailed but schematic ABS view (X-Y plane cross-section) of a first embodiment of a two read sensor read head that will fulfill the objects of this disclosure. For ease of visualization and discussion, the read sensors are shown as being aligned in the X-direction, but as discussed above, a value of ΔX less than 600 A (i.e., between 0 and 600 A) is appropriate. It is further noted that the two read sensors are typically formed by successive deposition processes.

Figure 5:
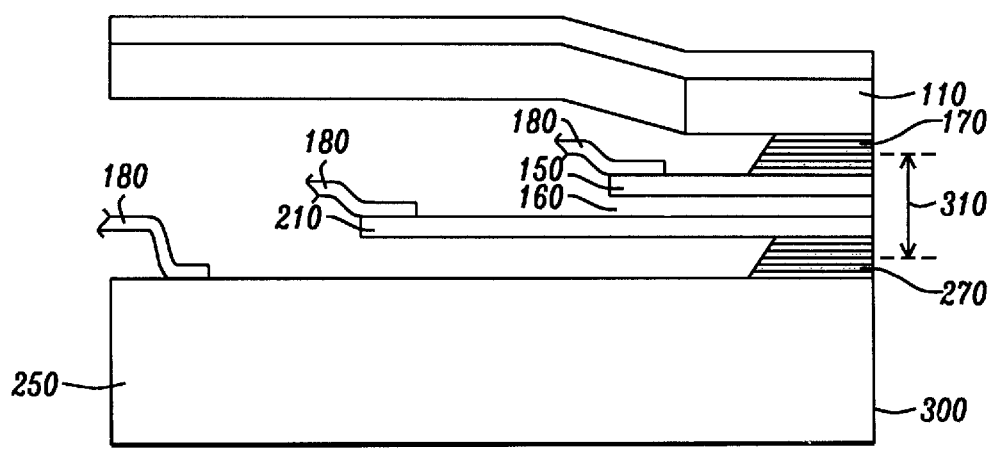
FIG. 5 is a schematic cross-sectional view of the two-sensor configuration (first embodiment) of FIG. 4, shown in the Y-Z plane. The sensors are shown in a four-lead configuration, where each sensor is surrounded by separate top and bottom shields and each sensor is equipped with a pair of conductive leads.

Referring simultaneously to FIG. 5, there is shown the identical fabrication of FIG. 4, with all its elements being identical to those in FIG. 4, except the view is in a Y-Z cross-sectional plane.

Referring to FIG. 4, the top sensor fabrication (100) includes a top shield/lead layer (110), a bottom shield/lead layer (150) and the active sensor element (170) formed between them. The active sensor element (170) includes a magnetic free layer (140) and it is patterned in a manner that enables a pair of magnetic biasing layers (120) to be symmetrically disposed abutting the sides of the sensor element (170) and to longitudinally bias the narrow free layer. An insulating layer (130) separates the biasing layer (120) from the body of the sensor element (170).

Beneath the bottom shield/lead layer (150), which is here a layer of NiFe of thickness approximately 150 A, but which should be less than 250 A, there is a layer of non-magnetic material which is approximately 150 A in thickness. Immediately below the layer of non-magnetic material is the top shield/lead layer (210) of the bottom sensor fabrication (200) which should be less than 250 A in thickness and is here approximately 150 A in thickness. It is to be noted that shield/lead layers need not be formed as single layers of NiFe but may be laminates of several different magnetic materials of high permeability. However, the thickness of the shield/lead layers must satisfy the constraint of the total ΔY separation.

Exactly like the top sensor fabrication (100), the bottom fabrication (200) includes a top shield (210), which is here a layer of NiFe of thickness less than 250 A that is here formed to approximately 150 A, and a patterned active sensor element (270) immediately beneath the top shield (210). The active sensor element (270) is patterned to allow a symmetrically placed pair of magnetic biasing layers (220) to abut its patterned sides. A symmetrically placed pair of insulating layers (230) is beneath the biasing layers. The active sensor element includes a magnetically free layer (240) within its patterned portion.

Referring to FIG. 5, there is shown schematically the identical fabrication shown in FIG. 4, however it is shown as a cross-section in the Y-Z plane. The illustration shows the planar ABS surface (300), with all layers extending rearward (Z-direction) therefrom. The two vertically (Y-direction) separated active sensor elements, (170) and (270) are shown and a double-ended arrow (310) indicates their ΔY separation, which is essentially measured from free layer to free layer and which is less than 900 A. The bottom shield/lead layer (150) of the top sensor (170) is here a layer of NiFe of less than 250 A thickness and that is here formed to approximately 150 A in thickness. The top shield/lead layer (210) of the bottom sensor (270) is also a layer of NiFe that is to be less than 250 A in thickness and is here formed to approximately 150 A in thickness. However it is noted that the shield/lead layers may be laminations of other magnetic and electrically conducting materials and the use of a single layer of NiFe is not a necessity, but the range of thicknesses of the shield/lead layers must be as specified so that the ΔY separation is obtained. The two shield/lead layers (150) and (210) are separated by a layer of non-magnetic material (160) that serves as a spacer layer and is between approximately 100 A and 150 A in thickness. It is understood that shield/lead layers (110) and (150) of the top sensor as well as shield/lead layers (210) and (250) of the bottom sensor, generally combine the roles of magnetic shields and non-shared conducting lead layers, through whose electrically conducting actions the independent signals read by the sensor elements may be analyzed and interpreted. The shield/lead layers may have their surfaces further coated with highly conductive material to enhance their electrical conduction and electrical contacts (not shown) with the sensor elements and additional contact leads (180) may be attached to connect the shield/lead layers to connection pads and ultimately to the electronic circuitry. In this first embodiment, therefore, four separate leads are utilized to obtain two sets of independent read signals from the two read sensors.

Second Embodiment

Figure 6:
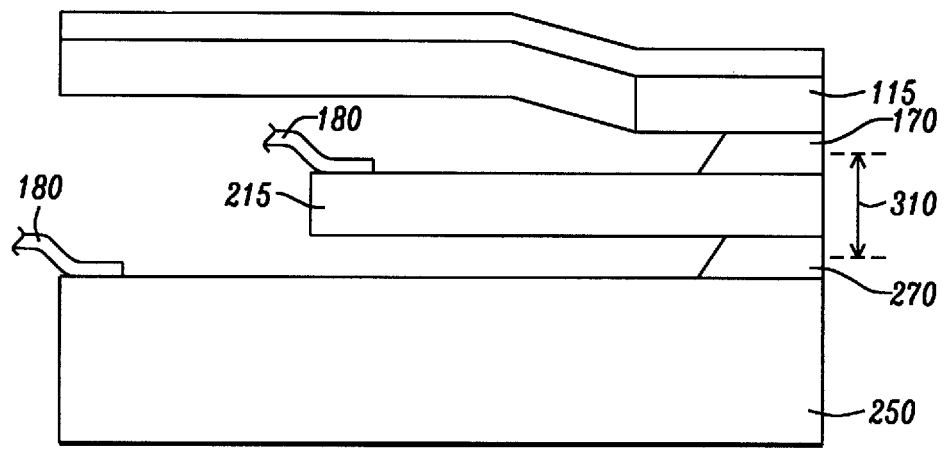
FIG. 6 is a schematic cross-sectional view of a two-sensor configuration (second embodiment) shown in the Y-Z plane. The sensors are shown in a three-lead configuration, where a common lead/shield combination separates the two sensors in the Y-direction and where a single top shield and lead is formed over the top sensor and a single bottom shield and lead is formed beneath the bottom sensor.

Referring now to FIG. 6 there is shown a schematic cross-sectional view of a two-read sensor configuration shown in the Y-Z plane. The read sensors are shown in a three-lead configuration, where a common shield/lead combination (215) separates the two sensors in the Y-direction and where a single top shield/lead layer (115) is formed over the top sensor and a single bottom shield/lead layer (250) is formed beneath the bottom sensor. The common shield/lead layer combination (215) is a layer of NiFe, or a lamination of several high permeability magnetic materials, formed to a thickness of less than approximately 400 A. This common shield/lead layer may be formed as two separate shield/lead layers that are then electrically coupled and provided with a single lead ((180) in FIG. 6) and then may also be magnetically coupled to form a single such layer less than 400 A in thickness. Alternatively, they may be formed as a single magnetic layer with electrically conductive properties and a single electrical lead. It is further noted that the two read sensors are typically formed by successive deposition processes.

As in the first embodiment, the active sensor elements (170) and (270) are identical in structure to those shown in FIG. 4 and they may be separated in the X-direction (crosstrack) by between 0 and 600 A (with the effect of skew angle to be constrained thereby). A double ended arrow (310) indicates the Y-direction (downtrack) separation, ΔY, measured between magnetically free layers (not explicitly shown), which should be less than 900 A.

Figure 7:
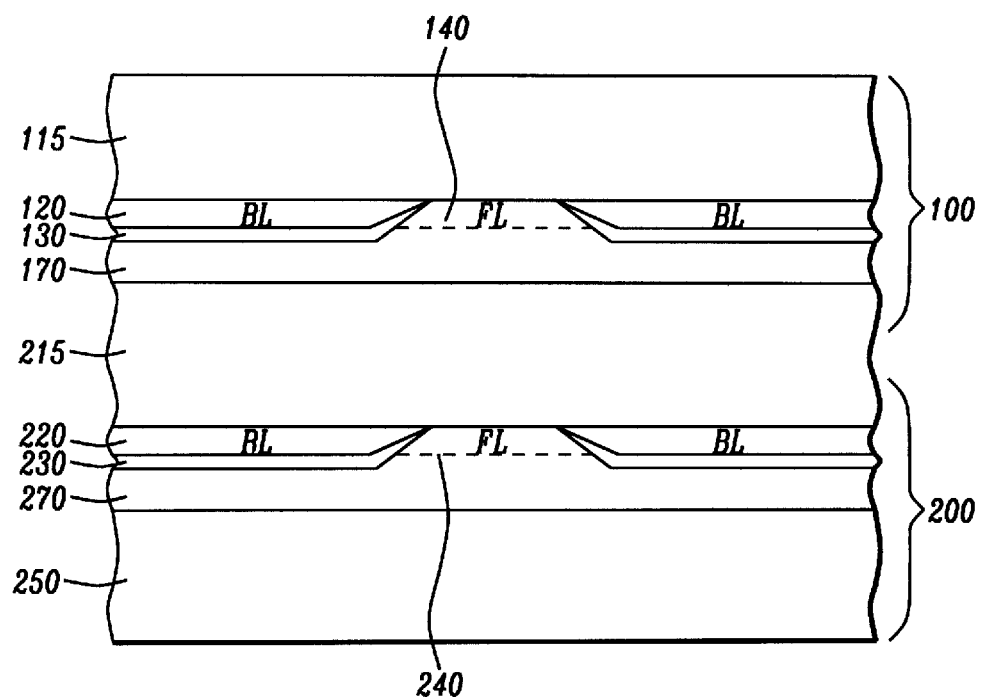
FIG. 7 is a more detailed schematic ABS view (X-Y plane cross-section) of the two sensors of FIG. 6 (second embodiment), showing the sensor layer structure as well as the various layers that separate the sensors in a Y-direction. The sensors are shown as being aligned in the X-direction, but this is not a necessary configuration and is shown for simplicity.

Referring to FIG. 7, there is shown schematically an ABS view of this second embodiment, analogous to that shown in FIG. 4 for the first embodiment. The illustration of FIG. 7 appears substantially identical to that in FIG. 4 except that the three layers (150), (160) and (210) separating the top and bottom sensor elements (170) and (270), are here collapsed into a single layer (215) that serves as a common shield/lead layer with a single electrical connection (see (180) of FIG. 6) for both the top (170) and bottom (270) sensor elements. As noted above, this common lead/shield layer may be formed by electrically connecting the separate shield/lead layers below the top read sensor and above the bottom read sensor, in effect creating the structure of the first embodiment but with the non-magnetic spacer layer being eliminated. In this second embodiment, therefore, only three electrical leads are required to obtain independent read signals from the two read sensors.

It is understood that shield/lead layers (115) and (215) above and below the top sensor as well as shield/lead layers (215) and (250) above and below the bottom sensor, generally combine the roles of magnetic shields and conducting lead layers, through whose independent electrically conducting actions the independent signals read by the sensor elements may be analyzed and interpreted. To improve the electrical conductivity of the shield/lead layers they may be coated with an additional layer of conductive material (not shown). In addition, as is shown already in FIG. 5, contact leads (180) may be attached between the shield/lead layers and contact pads on the outer surface of the read head.

As is understood by a person skilled in the art, the present description is illustrative of the present disclosure rather than limiting of the present disclosure. Revisions and modifications may be made to methods, materials, structures and dimensions employed in forming and providing a two-sensor read head, while still forming and providing such a structure and its method of formation in accord with the spirit and scope of the present disclosure as defined by the appended claims.

What is claimed is:

1. A read head comprising:
a top read sensor shielded above and below by upper and lower shield/lead layers respectively;
a bottom read sensor shielded above and below by upper and lower shield/lead layers respectively;
a non-magnetic spacer layer separating said lower shield/lead layer of said top read sensor from said upper shield/lead layer of said lower read sensor; wherein
a total of four leads are required for said upper read sensor and said lower read sensor to independently read a recorded track;
said top read sensor and said bottom read sensor each include a horizontal magnetic free layer; and wherein
said top read sensor and said bottom read sensor have a line of symmetry that is perpendicular to said magnetic free layer; wherein
said magnetic free layers are vertically separated by a downtrack separation ΔY; and
said lines of symmetry are horizontally separated by a crosstrack separation ΔX; wherein
said shield/lead layers provide independent output signals from said top read sensor and said bottom read sensor.

2. The read head of claim 1 wherein ΔX is less than 600 A.

3. The read head of claim 1 wherein ΔY is less than 900 A.

4. The read head of claim 1 wherein said lower shield/lead layer of said top read sensor is formed of a magnetic material of high permeability or of laminates of such material.

5. The read head of claim 1 wherein said lower shield/lead layer of said top read sensor is formed of NiFe.

6. The read head of claim 1 wherein said lower shield/lead layer of said top read sensor is less than 250 A in thickness.

7. The read head of claim 1 wherein said lower shield/lead layer of said top read sensor is approximately 150 A in thickness.

8. The read head of claim 1 wherein said top shield/lead layer of said bottom read sensor is formed of a magnetic material of high permeability or of laminates of such material.

9. The read head of claim 1 wherein said top shield/lead layer of said bottom read sensor is formed of NiFe.

10. The read head of claim 1 wherein said top shield/lead layer of said bottom read sensor is less than 250 A in thickness.

11. The read head of claim 1 wherein said top shield/lead layer of said bottom read sensor is approximately 150 A in thickness.

12. The read head of claim 1 wherein both said top read sensor and said bottom read sensor sense a single data track or, at most, sense a single data track and a portion of an adjacent track.

13. The read head of claim 1 wherein said non-magnetic spacer layer has a thickness of less than approximately 200 A.

14. The read head of claim 1 wherein said non-magnetic spacer layer has a thickness of approximately 100 A.

15. A read head comprising:
a top read sensor shielded above and below by upper and lower shield/lead layers respectively;
a bottom read sensor shielded above and below by upper and lower shield/lead layers respectively; wherein
said lower shield/lead layer of said top read sensor and said upper shield/lead layer of said bottom read sensor are electrically coupled to form a single common shield/lead layer for both said top read sensor and said bottom read sensor; wherein
a total of three leads are required for said top read sensor and said bottom read sensor to independently read a recorded track;
said top read sensor and said bottom read sensor each include a horizontal magnetic free layer; and wherein
said top read sensor and said bottom read sensor have a line of symmetry that is perpendicular to said magnetic free layer; wherein
said magnetic free layers are vertically separated by a downtrack separation $\Delta Y$; and
said lines of symmetry are horizontally separated by a crosstrack separation $\Delta X$; wherein
said shield/lead layers provide independent output signals from said top read element and said bottom read element.

16. The read head of claim 15 wherein $\Delta X$ is less than 600 A.

17. The read head of claim 15 wherein $\Delta Y$ is less than 900 A.

18. The read head of claim 15 wherein said lower shield/lead layer of said top sensor is formed of a magnetic material of high permeability or of laminates of such material.

19. The read head of claim 15 wherein said lower shield/lead layer of said top sensor is formed of NiFe.

20. The read head of claim 15 wherein said top shield/lead layer of said bottom sensor is formed of a magnetic material of high permeability or of laminates of such material.

21. The read head of claim 15 wherein said top shield/lead layer of said bottom sensor is formed of NiFe.

22. The read head of claim 12 wherein said top shield/lead layer of said bottom sensor and said bottom shield/lead layer of said bottom read sensor have a combined thickness that is less than approximately 400 A.

23. The read head of claim 15 wherein both said top sensor and said bottom sensor sense a single data track or, at most, sense a single data track and a portion of an adjacent data track.

24. The read head of claim 15 wherein said lower shield/lead layer of said top read sensor and said upper shield/lead layer of said bottom read sensor are both electrically and magnetically coupled to form a single shield/lead layer.

25. The read head of claim 15 wherein said lower shield/lead layer of said top read sensor and said upper shield/lead layer of said bottom read sensor are initially formed as a single layer having magnetic shielding and electrically conducting properties.

26. The read head of claim 1 wherein said top read sensor and said bottom read sensor are formed of separate thin film depositions.

27. The read head of claim 15 wherein said top read sensor and said bottom read sensor are formed of separate thin film depositions.

* * * * *